United States Patent
Shibata et al.

(10) Patent No.: US 6,891,293 B2
(45) Date of Patent: May 10, 2005

(54) FLEXIBLE DISK DRIVE WITH A GAP BETWEEN A MAIN FRAME AND A PERMANENT MAGNET OF A ROTOR SO THAT THE ROTOR DOES NOT FALL ALTHOUGH THE ROTOR IS UPENDED TO A STATOR

(75) Inventors: Akira Shibata, Murayama (JP); Yoshihito Otomo, Tendo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/271,143

(22) Filed: Oct. 15, 2002

(65) Prior Publication Data

US 2003/0102731 A1 Jun. 5, 2003

(30) Foreign Application Priority Data

Oct. 23, 2001 (JP) ........................................ 2001-324477

(51) Int. Cl.[7] ................................................ H02K 7/09
(52) U.S. Cl. ................................ 310/90.5; 310/156.01; 310/67 R; 310/254; 310/91
(58) Field of Search ............................ 310/67 R, 68 R, 310/254, 90, 91, 90.5, 156

(56) References Cited

U.S. PATENT DOCUMENTS

| | | | |
|---|---|---|---|
| 4,224,543 A | | 9/1980 | Morreale |
| 4,692,913 A | | 9/1987 | Ackerman et al. |
| 4,882,511 A | | 11/1989 | von der Heide |
| 5,408,153 A | * | 4/1995 | Imai et al. ................. 310/68 B |
| 5,436,517 A | * | 7/1995 | Ogawa ..................... 310/67 R |
| 5,623,382 A | * | 4/1997 | Moritan et al. ........... 360/99.08 |
| 6,013,965 A | * | 1/2000 | Suzuki et al. ................ 310/186 |
| 6,081,057 A | * | 6/2000 | Tanaka et al. ................. 310/90 |
| 6,081,058 A | * | 6/2000 | Suzuki et al. ........... 310/156.45 |
| 6,166,501 A | | 12/2000 | Furuki et al. |
| 6,218,760 B1 | * | 4/2001 | Sakuragi et al. ............. 310/254 |
| 6,232,687 B1 | | 5/2001 | Hollenbeck et al. |
| 6,316,856 B1 | * | 11/2001 | Kusaki et al. ................. 310/90 |
| 6,414,409 B1 | * | 7/2002 | Masuda ........................ 310/90 |
| 6,545,379 B2 | * | 4/2003 | Gomyo ..................... 310/67 R |
| 6,603,304 B2 | | 8/2003 | Sekine |
| 6,697,215 B2 | | 2/2004 | Sekine |
| 2003/0039061 A1 | | 2/2003 | Komatsu et al. |

FOREIGN PATENT DOCUMENTS

| | | |
|---|---|---|
| JP | 9-91859 A | 4/1997 |
| JP | 9-97493 | 4/1997 |
| JP | 9-97839 A | 4/1997 |
| JP | 2000-245125 A | 9/2000 |
| JP | 2001-178185 A | 6/2001 |
| JP | 2001-190055 A | 7/2001 |

* cited by examiner

Primary Examiner—Darren Schuberg
Assistant Examiner—Yahveh Comas
(74) Attorney, Agent, or Firm—Frishauf, Holtz, Goodman & Chick, P.C.

(57) ABSTRACT

In a flexible disk drive having a main frame in which a flexible disk is inserted and a direct-drive motor having a stator disposed on a main surface of the main frame and a rotor including a permanent magnet, a gap between the main surface of the main frame and the permanent magnet is set at a distance so that the rotor does not fall due to gravity by attracting the rotor to the main frame by the magnetic attractive force of the permanent magnet even if the rotor is turned upside down to the stator.

2 Claims, 11 Drawing Sheets

FLEXIBLE DISK DRIVE WITH A GAP BETWEEN A MAIN FRAME AND A PERMANENT MAGNET OF A ROTOR SO THAT THE ROTOR DOES NOT FALL ALTHOUGH THE ROTOR IS UPENDED TO A STATOR

BACKGROUND OF THE INVENTION

This invention relates to a flexible disk drive for rotatably driving a flexible disk inserted or loaded therein by a direct-drive (DD) motor such as a spindle motor.

In the manner which is well known in the art, the flexible disk drive (which may be hereinafter called "FDD" for short) of the type is a device for carrying out data recording and reproducing operation to and from a disk-shaped magnetic recording medium of the flexible disk (which may be hereinafter called "FD" for short) loaded therein. In addition, such a flexible disk drive is mounted or loaded in a portable electronic equipment such as a laptop personal computer, a notebook-size personal computer, a notebook-size word processor, or the like.

The flexible disk drive of the type comprises a magnetic head for reading/writing data from/to the magnetic recording medium of the flexible disk, a carriage assembly for supporting the magnetic head at a tip thereof with the magnetic head movably along a predetermined radial direction to the flexible disk, a stepping motor for moving the carriage assembly along the predetermined radial direction, and a spindle motor for rotatably driving the magnetic recording medium with the floppy disk held. The spindle motor is one of direct-drive (DD) motors.

In order to control such a flexible disk drive, an FDD control apparatus is already proposed. By way of example, Japanese Unexamined Patent Publication Tokkai No. Hei 9-97,493 or JP-A 9-97493 discloses, as the FDD control apparatus, one integrated circuit (IC) chip which incorporates first through third control circuits therein. The first control circuit is a reading/writing (hereinafter called "R/W") control circuit for controlling reading/writing of data. The second control circuit is a stepping motor (hereinafter called "STP") control circuit for controlling drive of the stepping motor. The third control circuit is a general controlling (hereinafter called "CTL") control circuit for controlling whole operation of the flexible disk drive. The CTL control circuit may be called a logic circuit. This IC chip is generally implemented by a metal oxide semiconductor (MOS) IC chip where a number of MOS field effect transistors (FETs) are integrated therein.

The FDD control apparatus comprises not only the one IC chip but also a spindle motor IC chip for controlling drive of the spindle motor. The spindle motor IC chip is implemented by a bipolar IC chip where a number of bipolar transistors are integrated therein.

Now, flexible disk drives have different specifications due to customers or users. The specification defines, for example, drive select 0 or 1, the presence or absence of a special seek function, the presence or absence of an automatic chucking function, a difference of logic for a density out signal, a difference of logic for a mode select signal, 1 M mode 250 kbps or 300 kbps, and so on. If development is made of one IC chips which individually satisfy the different specification, a number types of one IC chips must be prepared. In order to avoid this, a one IC chip having a selectable function circuit is already proposed, for example, in Japanese Unexamined Patent Publication Tokkai No. Hei 9-97,839 or JP-A 9-97839 wherein all functions satisfying all specifications are preliminarily incorporated therein and one of the functions is selected in accordance with a particular specification.

In the manner which is well known in the art, the flexible disk driven by the flexible disk drive includes a disk-shaped magnetic recording medium accessed by the magnetic head. The magnetic recording medium has a plurality of tracks on a surface thereof that serve as paths for recording data and that are formed in a concentric circle along a radial direction. The flexible disk has eighty tracks on one side which include the most outer circumference track (which is named "TR00") and the most inner circumference track (which is named "TR79"). The most outer circumference track TR00 is herein called the most end track.

It is necessary to position the magnetic head at a desired track position in a case where the flexible disk is accessed by the magnetic head in the flexible disk drive. For this purpose, the carriage assembly for supporting the magnetic head at the tip thereof must be positioned. Inasmuch as the stepping motor is used as a driving arrangement for driving the carriage assembly, it is possible for the flexible disk drive to easily carry out the positioning of the carriage assembly. In spite of this, it is necessary for the flexible disk drive to detect only the position of the most end track TR00 in the magnetic recording medium of the flexible disk loaded therein. In order to detect the position of the most end track TR00, the carriage assembly is provided with an interception plate which projects from a base section thereof downwards and a photointerrupter is mounted on a substrate in the vicinity of a main frame opposed to the carriage assembly. For example, see Japanese Unexamined Patent Publication Tokkai No. Hei 9-91,859 or JP-A 9-91859. That is, it is possible to detect that the magnetic head is laid in the position of the most end track TR00 in the magnetic recording medium of the flexible disk because the interception plate intercepts an optical path in the photointerrupter. Such a track position detecting mechanism is called a "00 sensor" in the art.

In the flexible disk drive where the DD (direct-drive) motor such as a spindle motor is used for rotatably driving the flexible disk, an index signal is generated on the basis of operation in periphery of a rotor of the DD motor. More specifically, a notch portion is partially provided with a peripheral side surface of a disk-shaped casing composing the rotor while a magnet is disposed inside the casing so that only one magnetic pole (e.g. a north pole) is visible via the notch portion. Such a magnet is called an index detection magnet. In addition, on a main frame on which a stator of the DD motor and so on are mounted, a main printed wiring board on which a predetermined circuit is formed is disposed. A Hall element is located on the main printed wiring board at a predetermined position corresponding to the outside of the rotor. The Hall element is called an index detection Hall element.

Herein, the Hall element is a semiconductor element applying a Hall effect. The Hall element is a phenomenon where an electric field occurs in a conductor in a y-direction perpendicular to both of an x-direction and a z-direction when the electric current flows in the x-direction in the conductor and when the magnetic field is applied in the z-direction perpendicular to the x-direction. The electric field caused thereby is a Hall electric field and an output of the Hall element in response thereto is a Hall output.

In addition, Hall elements are used not only as the index detection Hall element but also for detecting a position in the rotor of the spindle motor. Such Hall elements are called position detection Hall elements. A spindle motor using the position detection Hall elements is called a Hall motor.

Although the Hall motor requires three position detection Hall elements, in order to omit their position detection Hall elements, proposal is made to a new motor where states of currents flowing in three-phase coils of the stator are switched on the basis of polarity of an electromotive force induced in one of the three-phase coils that is put into a high-impedance state (e.g. see Japanese Unexamined Patent Publication Tokkai No. 2000-245,125 or JP-A 2000-245125).

In the manner which is described above, in prior art, a single-pole magnetized magnet is used as the index detection magnet. It is difficult to obtain a stable generation timing for the index signal. Accordingly, in order to obtain the stable generation timing for the index signal, the present co-inventors already proposes and files an application to use, as the index detection magnet, a double-pole magnetized magnet (that is, one where a south pole and a north pole are put side by side) (see Japanese Unexamined Patent Publication Tokkai No. 2001-190,055 or JP-A 2001-190055).

In addition, the index detection magnet mounted on the rotor and the index detection Hall element located on the printed wiring board are disposed so that they are apart from each other at a magnetic field detection position by a little distance. The printed wiring board is disposed so as to extend in a direction normal to a rotation axis of the spindle motor. Accordingly, a conventional index detection Hall element necessarily has a magnetic detection surface which is disposed to extend in parallel with a direction of the magnetic field generated by the index detection magnet.

In the manner which will later be described in conjunction with FIGS. 1 through 9, the conventional flexible disk drive must comprise not only a main frame but also a motor frame for mounting the DD motor (spindle motor) thereon. In other words, the motor frame is constituted as another piece different from the main frame.

In the conventional DD motor (the spindle motor), a permanent magnet composing a rotor has a bottom portion opposite to a main surface of the motor frame (a main surface of the printed wiring board) that is subjected to motor-servo magnetized elements along a circumferential direction thereof. The main surface of the motor frame and the bottom portion of the permanent magnet are opposite to each other with a predetermined gap so as to enable to detect the motor-servo magnetized elements by a frequency generation pattern.

In the DD motor (the spindle motor), on rotating the rotor, an adsorption force (a magnetic attractive force) between the permanent magnet composing the rotor and the motor frame acts as a torque loss against a rotation direction of the DD motor. In order to improve a motor torque of the DD motor (the spindle motor), it is desirable to weaken the adsorption force for the motor frame by the permanent magnet by widening the above-mentioned gap as far as possible.

However, in the conventional DD motor (spindle motor), the bottom portion of the permanent magnet opposite to the motor frame is subjected to the motor-servo magnetized elements along the circumferential direction thereof. Therefore, if the above-mentioned gap is widened, the frequency generation pattern produces the counterelectromotive force having a small output caused by rotation of the rotor (the motor-servo magnetizes elements of the permanent magnet). Accordingly, in the conventional flexible disk drive, it is difficult to widen the above-mentioned gap in the DD motor (the spindle motor) up to a predetermined distance or more. As a result, it is difficult to prevent the torque loss in the DD motor (the spindle motor).

SUMMARY OF THE INVENTION

It is therefore an object of the present invention to provide a flexible disk drive which is capable of improving a motor torque in a DD motor (a spindle motor).

Other objects of this invention will become clear as the description proceeds.

On describing the gist of an aspect of this invention, it is possible to be understood that a flexible disk drive comprises a main frame in which a flexible disk is inserted. The main frame is made of magnetic material and has a main surface. Mounted on the main surface of the main frame, a direct-drive motor rotatably drives the flexible disk inserted in the main frame. The direct-drive motor comprises a stator disposed on the main surface of the main frame and a rotor rotatably supported on the stator. The stator includes N poles and three-phase coils wound around the N poles, where N represents a first positive integer which is a multiple of three. The rotor includes a permanent magnet having M main magnetized elements, where M represents a second positive integer which is not less than four and which is different from the first positive integer. The rotor is disposed on the main surface of the main frame with a gap between the main surface of the main frame and the permanent magnet at a state where the rotor is magnetically attracted to the main frame by a magnetic attractive force of the permanent magnet.

According to the aspect of this invention, the above-mentioned gap is set at a distance so that the rotor does not fall due to gravity by attracting the rotor to the main frame by the magnetic attractive force of the permanent magnet although the rotor is upended to the stator.

Preferably, the main frame may be composed of one piece in which the main frame and a motor frame part are integrated. In this event, the direct-drive motor is mounted on the motor frame part. The motor frame part may have a drawn-shape obtained by drawing the main frame.

DESCRIPTION OF THE PREFERRED EMBODIMENT

Figure 1:
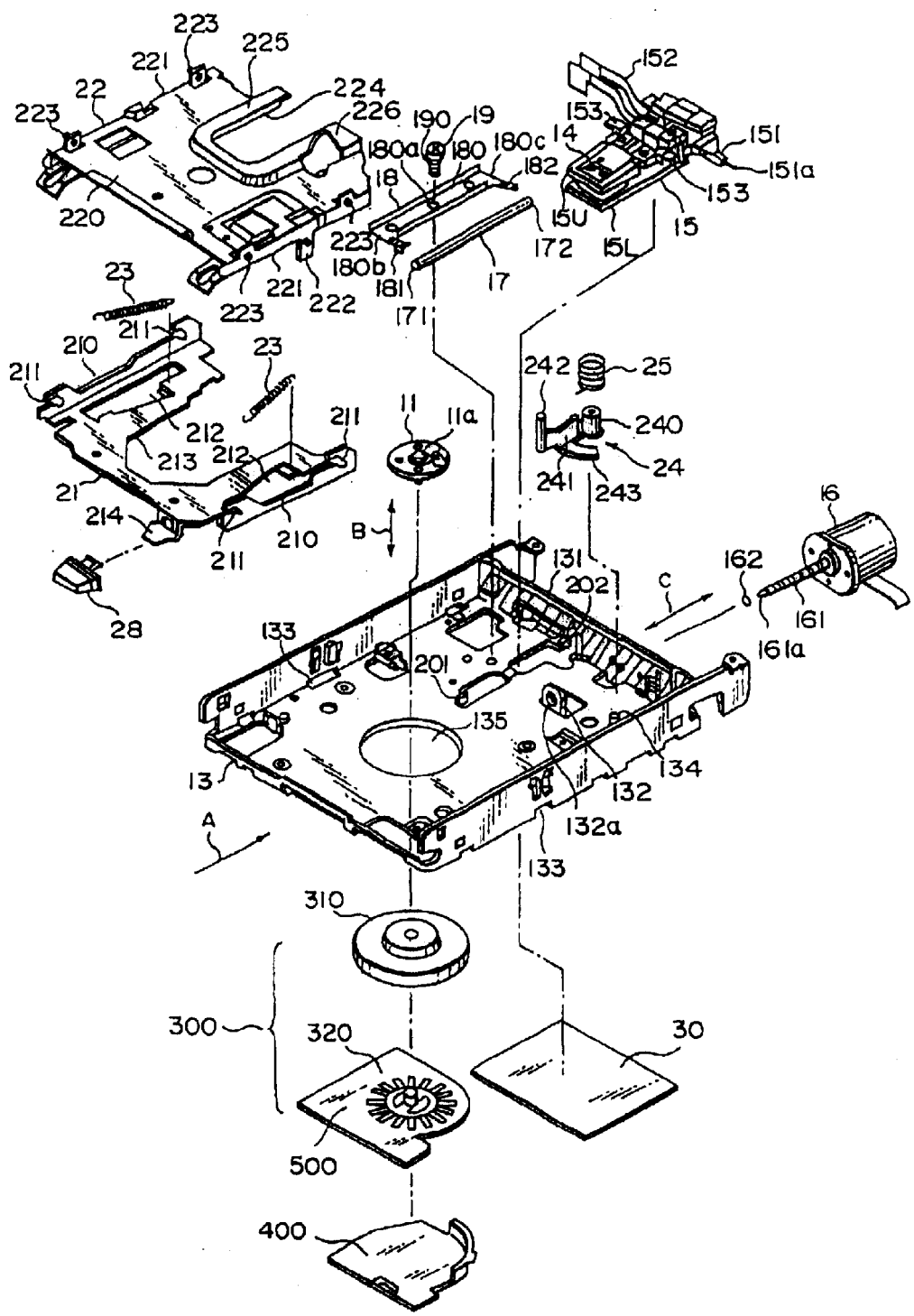
FIG. 1 is an exploded perspective view showing a main part of a conventional flexible disk drive.
Figure 2:
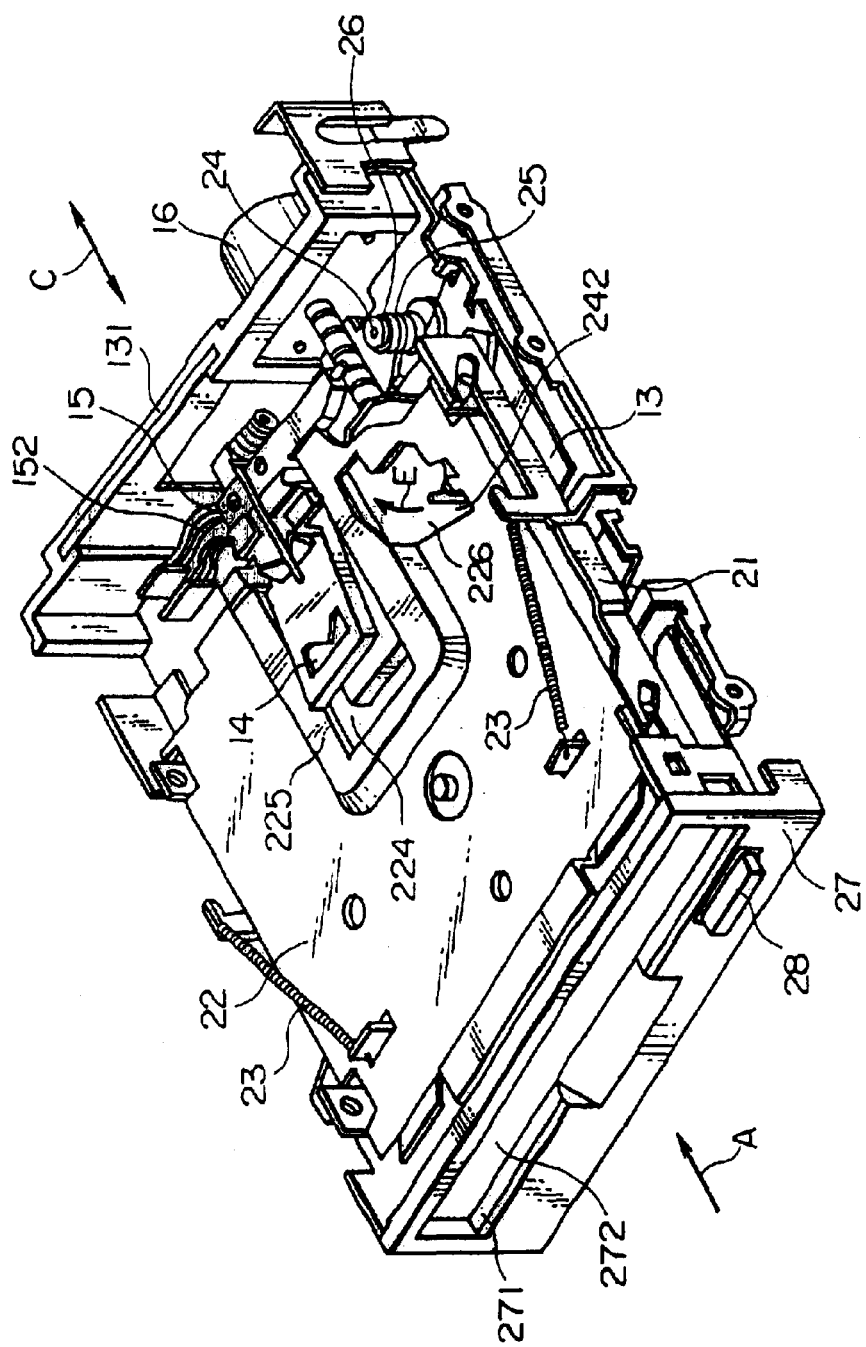
FIG. 2 is a schematic perspective view of the flexible disk drive illustrated in FIG. 1 as view from front obliquely.

Referring to FIGS. 1 and 2, a conventional flexible disk drive of a 3.5 inch type will be described at first in order to facilitate an understanding of the present invention. FIG. 1 is an exploded perspective view of the conventional flexible disk drive. Although the conventional flexible disk drive has a front panel and a case, they are omitted in FIG. 1. FIG. 2 is a perspective view of the conventional flexible disk drive viewing from a front side. An upper cover (the case) is omitted in FIG. 2.

The illustrated flexible disk drive is a device for driving a flexible disk of a 3.5-inch type (which will later be described). The flexible disk is loaded or inserted in the flexible disk drive from a direction indicated by an arrow A in FIGS. 1 and 2. The loaded flexible disk is held on a disk table 11 having a rotation axis 11a. In this event, the rotation axis 11a coincides with a center axis of the flexible disk. In the manner which will later be described, the disk table 11 is rotatably supported on a frame main surface of the main frame 13. Accordingly, the rotation axis 11a of the disk table 11 has an axial direction B which extends in parallel with a thick direction of the main frame 13. The disk table 11 is rotatably driven by a spindle motor or a direct-drive (DD) motor 300, which is mounted on a frame back surface of the main frame 13, thereby a magnetic recording medium of the flexible disk rotates. In addition, on the frame back surface of the main frame 13 is attached a main printed wiring board 30 on which a number of electronic parts (not shown) are mounted. Among the electronic parts, a control circuit carried out a driving control of the spindle motor 300.

The flexible disk drive comprises a pair of upper and lower magnetic heads 14 (only the upper magnetic head is illustrated) for reading/writing data from/to the magnetic recording medium of the flexible disk. The magnetic heads 14 are supported in a carriage assembly 15 at a tip thereof that is laid in the flexible disk drive at a rear side. That is, the carriage assembly 15 comprises an upper carriage 15U for supporting the upper magnetic head 14 and a lower carriage 15L for supporting the lower magnetic head. The carriage assembly 15 is disposed over the frame main surface of the main frame 13 and is apart from the main frame 13 in the manner which will later be described. The carriage assembly 15 supports the magnetic heads 14 at the tip thereof movably along a predetermined radial direction (i.e. a direction indicated by an arrow C in FIGS. 1 and 2) to the flexible disk.

In addition, the main frame 13 has at the rear side a side wall 131 on which a stepping motor 16 is fixed. The stepping motor 16 linearly drives the carriage assembly 15 along the predetermined radial direction C. More specifically, the stepping motor 16 has an axis of rotation (a driving shaft) 161 which extends in parallel with the predetermined radial direction C and which is threaded to form a male screw. The driving shaft 161 has a tip 161a which penetrates a hole 132a bored in a bent piece 132 and which is provided with a steel ball 162. The bent piece 132 is raised from the frame main surface of the main frame 13 by cutting and bending. By the hole 132a and the steel ball 152, a position of the driving shaft 161 is defined so as to extend in parallel with the predetermined radial direction C and the tip 161a is rotatably held.

On the other hand, the carriage assembly 15 comprises an arm 151 which extends from the lower carriage 15L to the driving shaft 161. The arm 151 has a leading edge 151a which is bent so as to engage with the root in the male screw of the driving shaft 161. Therefore, when the driving shaft 161 of the stepping motor 16 rotates, the leading edge 151a of the arm 151 moves along the root in the male screw of the driving shaft 161, thereby moving the carriage assembly 15 along the predetermined radial direction C. At any rate, the stepping motor 16 serves as a driving arrangement for linearly moving the carriage assembly 15 along the predetermined radial direction C.

Inasmuch as the driving shaft 161 of the stepping motor 16 is disposed at one side of the carriage assembly 15, the one side of the carriage assembly 15 is movably supported by the driving shaft 161 and is apart from the frame main surface of the main frame 13. However, because support occurs by the driving shaft 161, it is difficult to dispose the whole of the carriage assembly 15 apart from the frame main surface of the frame 13. For this purpose, it is necessary to support and guide the carriage assembly 15 at another side thereof. To guide the carriage assembly 15 is a guide bar 17. That is, the guide bar 17 is opposed to the driving shaft 17 of the stepping motor 16 with the carriage assembly 15 inserted between the guide bar 17 and the driving shaft 161. The guide bar 17 extends in parallel with the predetermined radial direction C and has one end 171 and another end 172 which are mounted on the frame main surface of the main frame 13 in the manner which later be described. The guide bar 17 guides the carriage assembly 15 along the predetermined radial direction C. As a result, the whole of the carriage assembly 15 is disposed apart from the frame main surface of the main frame 13.

In addition, a flexible printed circuit (FPC) 152 extends from the carriage assembly 15 to the vicinity of the guide bar 17 and the flexible printed circuit 152 are electrically connected to the main printed wiring board 30 attached to the frame back surface of the main frame 13.

The guide bar 17 is clamped on the frame main surface of the main frame 13 by a guide bar clamp 18. The guide bar clamp 18 is fixed on the frame main surface of the main frame 13 at a center portion thereof by a binding small screw 19. More specifically, the guide bar clamp 18 comprises a rectangular fixed member 180 having a length longer than that of the guide bar 17 by a short distance. In about the center of the rectangular fixed member 180, a hole 180a is drilled through which a screw shaft 190 of the binding small screw 19 passes. The rectangular fixed member 180 has one end 180b and another end 180c from which a pair of arms 181 and 182 extend to clamp the one end 171 and the other end 172 of the guide bar 17 which the guide bar 17 sandwiched between the arms 181 and 182, respectively.

Inasmuch as the guide bar clamp 18 merely clamps the guide bar 17, the guide bar 17 cannot be fixed on the frame main surface of the main frame 13 by the guide bar clamp 18 alone. For this purpose, a pair of locating members for locating the both ends 171 and 172 of the guide bar 17 is needed. As the pair of locating members, a pair of bent pieces 201 and 202 is used which are formed by cutting and bending parts of the main frame 13. At any rate, the pair of bent pieces 201 and 202 locates both ends 171 and 172 of the guide bar 17 to mount the guide bar 17 on the frame main surface of the main frame 13 in cooperation with the guide bar clamp 18.

The lower carriage 15L of the carriage assembly 15 serves as a supporting frame for supporting the carriage assembly 15 slidably along the guide bar 17. The lower carriage 15L has a projecting portion (not shown) which projects into the frame main surface of the main frame 13 at a side of the guide bar 17. The guide bar 17 is slidably fitted in the projection portion.

The flexible disk drive further comprises an eject plate 21 and a disk holder 22. Each of the main frame 13, the eject plate 21, and the disk holder 22 is formed to perform bending, press working, and bending of a metal plate.

The eject plate 21 is mounted on the frame main surface of the main frame 13 slidably along the insertion direction A of the flexible disk and an opposite direction. In the manner which will later become clear, the eject plate 21 holds, in cooperation with the disk holder 22, the flexible disk on operating of the floppy disk drive. In addition, the eject plate 21 holds the flexible disk slidably along in the insertion direction A so as to allow the flexible disk drive to load the flexible disk therein along the insertion direction A and to allow the flexible disk drive to eject the flexible disk therefrom along the opposite direction. The eject plate 21 comprises a pair of side walls 210 which are opposed to each other. Each of the side walls 210 has a pair of cam portions 211. In addition, the eject plate 21 has a bottom surface on which cut portions 212 are formed along the both side walls 210 and a U-shaped cut portion 213 is formed at a center portion thereof so as to enclose the disk table 11. Furthermore, the eject plate 21 has a back surface on which a pin (not shown) is formed. The pin engages with a stop part of an eject lever which will later be described.

The disk holder 22 is disposed on the eject plate 21. The disk holder 22 comprises a principal surface 220 and a pair of side walls 221 which is formed at both side ends of the principal surface 220 and which is opposed to each other. The both side walls 221 have projection pieces 222 (only one is illustrated). The projection pieces 222 are inserted in bores 133 of the main frame 13 through the cut portions 212 of the eject plate 21. Inasmuch as the projection pieces 222 are inserted in the bores 133 of the main frame 13, the disk holder 22 is positioned against the main frame 13 in the insertion direction A and the disk holder 22 is reciprocated in the axial direction B of the rotation axis 11a of the disk table 11. Each of the both side walls 221 has a pair of pins 223. The pins 223 are inserted in the cam portions 211 formed in the side walls 210 of the eject plate 21. Between the disk holder 22 and the eject plate 21, eject springs 23 bridge.

Although the disk holder 22 is provided with the projection pieces 22 and the bores 133 are formed in the main frame 13 in this example, restriction is not made to this and the main frame 13 may be provided with projection pieces and bores may be formed in the disk holder 22.

In addition, the disk holder 22 has a rectangular opening section 224 at a center portion in a back side in the insertion direction A. The rectangular opening section 224 is laid in a corresponding position of the upper carriage 15U of the carriage assembly 15 and extends in the predetermined radial direction C. So as to enclose the opening section 224, a U-shaped swelled portion 225 is formed where the principal surface 220 of the disk holder swells at periphery upwards. On the other hand, the carriage assembly 15 comprises a pair of side arms 153 which extends in a lateral direction perpendicular to a longitudinal direction of the carriage assembly 15. The side arms 153 are located on or over the swelled portion 225. In the manner which will later be described, in a state where the flexible disk is ejected from the disk holder 22, the side arms 153 engages with the swelled portion 225, thereby the pair of upper and lower magnetic heads 14 are apart from each other. In addition, the disk holder 22 has an additional opening section 226 at a right-hand side of the opening section 224 in the back side of the insertion direction A. The opening section 226 has a shape so as to allow a lever part of the eject lever (which will later be described) rotatably move.

In the vicinity of the carriage assembly 15 on the main frame 13, the eject lever depicted at 24 is formed to rotatably move. More specifically, on the main frame 13, a rod pin 134 stands up which extends from the frame main surface thereof upwards. The eject lever 24 comprises a cylindrical part 240 in which the rod pin 134 is inserted, an arm part (the lever part) 241 extending from the cylindrical part 240 in a radial direction, a projection part 242 which is formed in the arm part 241 at a free end thereof and which extends upwards, and an arc-shaped stop part 243 which extends from a side of the free end of the arm part 241 in a circumferential direction. In the eject lever 24, an eject lever spring 25 is attached around the cylindrical part 240 and the eject lever spring 25 urges the eject lever 24 in a counterclockwise direction on a paper of FIG. 1. The projection part 242 of the eject lever 24 is freely fitted in the opening section 226 of the disk holder 22. The projection part 242 is engaged with an upper end of a right-hand side edge of a shutter in the flexible disk, that will later be described, to control opening and shutting of the shutter. In addition, as shown in FIG. 2, a screw 26 is thrust into a tip of the rod pin 134, thereby preventing the eject lever 24 from falling off the rod pin 134.

In addition, the main frame 13 has a front end section on which a front panel 27 is attached. The front panel 27 has an opening 271 for taking the flexible disk in and out and a door 272 for opening and shutting the opening 271. Into the front panel 27, an eject button 28 projects movably backward and forward. The eject button 28 is fitted in a protrusion part 214 which protrudes from a front end of the eject plate 21 forwards.

Figure 3:
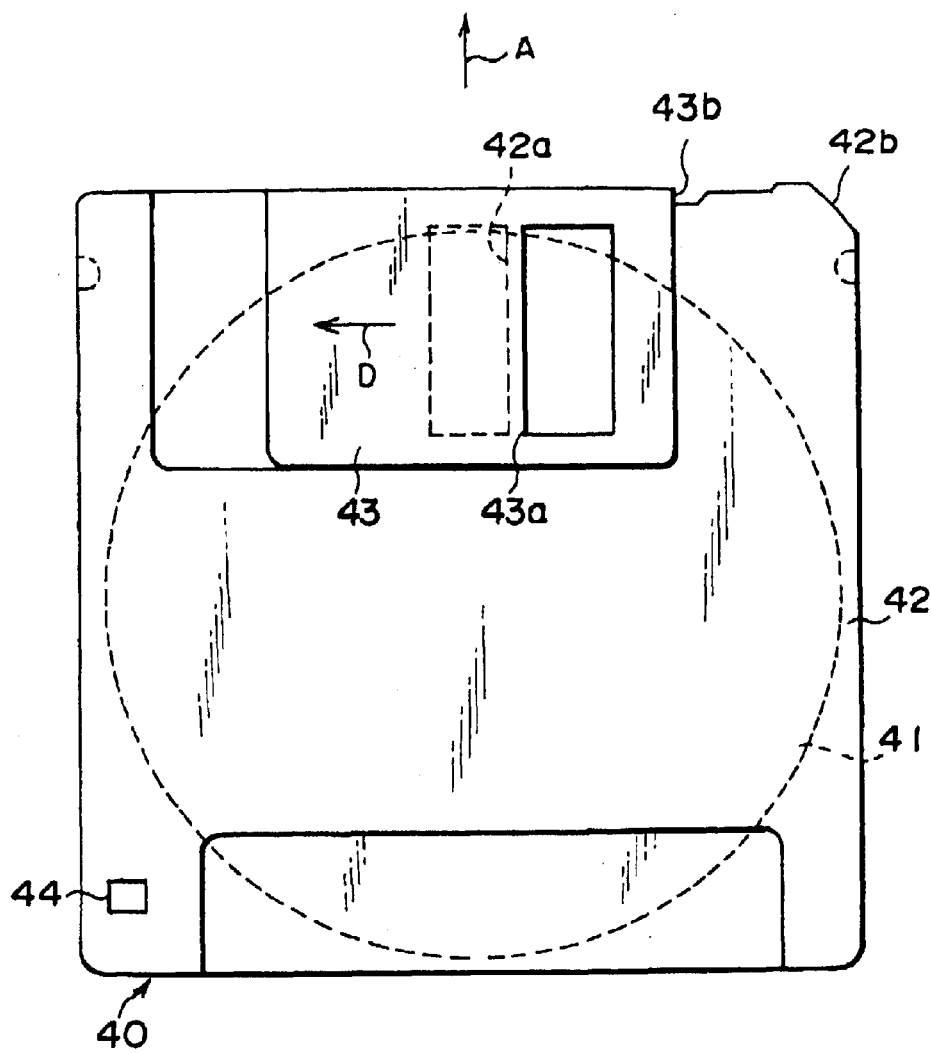
FIG. 3 is a plan view showing a flexible disk driven by the flexible disk drive.

Referring to FIG. 3, the description will proceed to the flexible disk (FD) driven by the flexible disk drive (FDD) illustrated in FIGS. 1 and 2. The illustrated flexible disk depicted at 40 comprises a disk-shaped magnetic recording medium 41, a shell 42 for covering or receiving the magnetic recording medium 41, and the shutter depicted at 43 slidably in a direction indicated by an arrow D in FIG. 3. The shutter 43 has a shutter window 43a. The shutter 43 is urged by a spring member (not shown) in a direction reverse to the direction D. The shell 42 has a head window 42a to enable an access of the magnetic recording medium 41 by the magnetic heads 14 (FIGS. 1 and 2) of the flexible disk drive.

In a state where the flexible disk 40 is not loaded in the flexible disk drive, the head window 43a is covered by the shutter 43 as shown in FIG. 3. When the flexible disk 40 is loaded in the flexible disk drive, the projection part 242 of the eject lever 42 (FIG. 1) engages with the upper end 43b of the right-hand side edge of the shutter 43 to slide the shutter 43 in the direction depicted at the arrow D.

The shell 42 has a chamfered portion 42b at a corner portion in upper and right-hand side. The chamfered portion 42b is for preventing reverse insertion (wrong insertion in a vertical direction or the insertion direction A). In addition, a write protection hole 44 is bored in the shell 42 at a corner portion in rear and left-hand side in the insertion direction A of FIG. 3.

As described above, in the flexible disk 40 driven by the flexible disk drive, the magnetic recording medium 41 accessed by the magnetic heads 14 (FIGS. 1 and 2) has a plurality of tracks on a surface thereof that serve as paths for recording data and that are formed in a concentric circle along a radial direction. The flexible disk 40 has eighty tracks on side which include the most outer circumference track (the most end track) TR00 and the most inner circumference track TR79.

Figure 4:
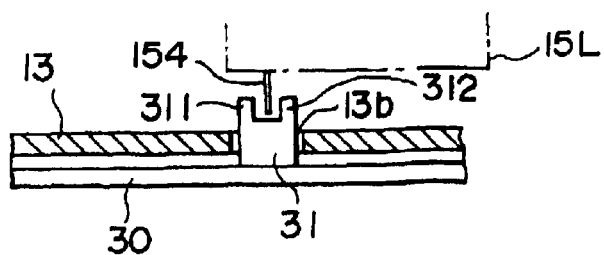
FIG. 4 is a sectional view for use in describing a set-up structure of a track position detecting mechanism (00 sensor) used in the flexible disk drive.

Referring to FIG. 4 in addition to FIG. 1, the description will proceed to a track position detecting mechanism (a 00 sensor) for detecting a position of the most end track TR00 of the magnetic recording medium 41.

In the carriage assembly 15, the lower carriage 15L is provided with an interception plate 154 which projects from a base section thereof downwards. On the other hand, the main printed wiring board 30 is disposed on the frame back surface of the main frame 13 opposed to the carriage assembly 15. On the main printed wiring board 30, a photointerrupter 31, which is used as the track position detecting mechanism (the 00 sensor), is mounted. For this purpose, the main frame 13 has a bore 13b in which the photointerrupter 31 is inserted.

In the manner which is well known in the art, the photointerrupter 31 comprises a first protrusion section 311 into which a light-emitting element (which will later be described) is built and a second protrusion section 312 into which a light-receiving element (which will later be described) is built. The first protrusion section 311 and the second protrusion section 312 are opposed to each other at two opposite wall surfaces which have two opening sections (not shown), as shown in FIG. 4. Through the two opening sections, an optical path is formed to go from the light-emitting element to the light-receiving element. In addition, the above-mentioned interception plate 154 passes through a path between the first protrusion section 311 and the second protrusion section 312.

In the 00 sensor with such a structure, it is possible to detect that the magnetic heads 14 (FIGS. 1 and 2) are laid in the position of the most end track TR00 in the magnetic recording medium 41 of the flexible disk 40 because the interception plate 154 intercepts the optical path in the phtointerrupter 31.

Figure 5:
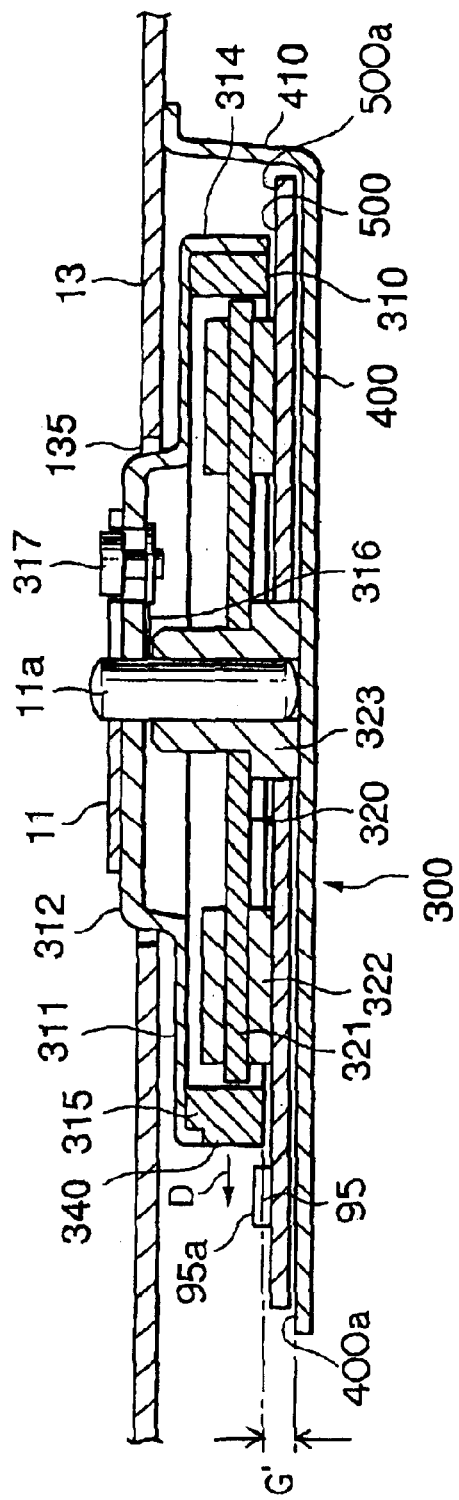
FIG. 5 is a sectional view showing a relationship between a main frame and a direct-drive motor (spindle motor) mounted thereon in the flexible disk drive illustrated in FIG. 1.

Referring now to FIG. 5, the description will proceed to the DD motor (spindle motor) 300 for use in the above-mentioned flexible disk drive.

The illustrated DD motor 300 comprises a rotor 310 and a stator 320 combined with the rotor 310. The rotor 310 comprises a disk-shaped metallic casing 311 which has a protruding portion 312 formed at its center to protrude upward. The protruding portion 312 has an upper surface on which the above-mentioned disk table 11 is mounted. The main frame 13 has a circular opening 134 which allows only an upper part of the protruding portion 312 to pass therethrough and project on the frame main surface of the main frame 13. As a result, the disk table 11 is projected on the frame main surface of the main frame 13.

The rotation axis or shaft 11a made of metal is integrally fixed to the rotor 310 at the center thereof to pass through the casing 311 and the disk table 11. When the disk table 11 is injection-molded by the use of a plastic magnet, the casing 311 and the rotation shaft 11a are integrally assembled. The casing 311 has a cylindrical member 314 formed on its outer periphery to extend downward. A ring-shaped permanent magnet 315 is attached to an inner surface of the cylindrical member 314.

The permanent magnet 315 has a plurality of main magnetized elements along a circumferential direction thereof. In addition, the permanent magnet 315 has a bottom portion which has a plurality of motor-servo magnetized elements along a circumferential direction thereof. When the later-mentioned stator 320 has fifteen poles, the main magnetized elements are equal in number to twenty (that is, north poles N are equal in number to ten and south poles S are equal in number to ten). On the other hand, the motor-servo magnetized elements are equal to one hundred and twenty (that is, north poles N are equal in number to sixty and south poles S are equal in number to sixty) independently of the number of the poles of the stator 320. The main magnetized elements are called driving magnetized portions while the motor-servo magnetized elements are called detection magnetized portions.

In addition, as shown in FIG. 5, the cylindrical member 314 or an external peripheral side wall of the casing 311 has a notch portion formed by cutting a part of the external peripheral side wall. A part of the main magnetized elements protrudes from the notch portion and is exposed as a magnetic pole 340. The exposed magnetic pole 340 is operable as the above-mentioned index detection magnet.

The protruding portion 312 is provided with an arm 316 attached to a bottom surface thereof. A drive roller 317 is rotatably mounted on the arm 316. Each of the protruding portion 312 and the disk table 11 has a generally rectangular hole formed therein. Through these holes, the drive roller 317 projects upward from the disk table 11. The flexible disk 40 (FIG. 3) received in the flexible disk drive is placed on the disk table 11. The drive roller 317 is inserted in and engaged with a hole (not shown) formed in a hub (not shown) of the flexible disk 40. Thus, the magnetic disk medium 41 (FIG. 3) is rotated following the rotation of the rotor 310.

On the other hand, the stator 320 is attached to the frame back surface of the main frame 13 by means of a motor frame 400 made of metal. More specifically, the stator 320 is formed on a printed wiring board 500 mounted on the principal surface of the metallic motor frame 400. The stator 320 comprises a core assembly having a plurality of stator cores 321, a plurality of stator coils 322, and a center metal (bearing unit) 323. Each of the stator core 321 extends radially outwardly from an outer periphery of a ring-shaped member of the center metal 323. Each of stator coils 322 is wound around an end portion of each corresponding stator core 321. The center metal 323 is formed at the center of the printed wiring board 500 and rotatably supports the rotation shaft 11a. The motor frame 400 has a plurality of attaching elements 410 of an inverted-L shape which extend upward from a peripheral edge of the motor frame 400 to abut against the frame back surface of the main frame 13.

Figure 6:
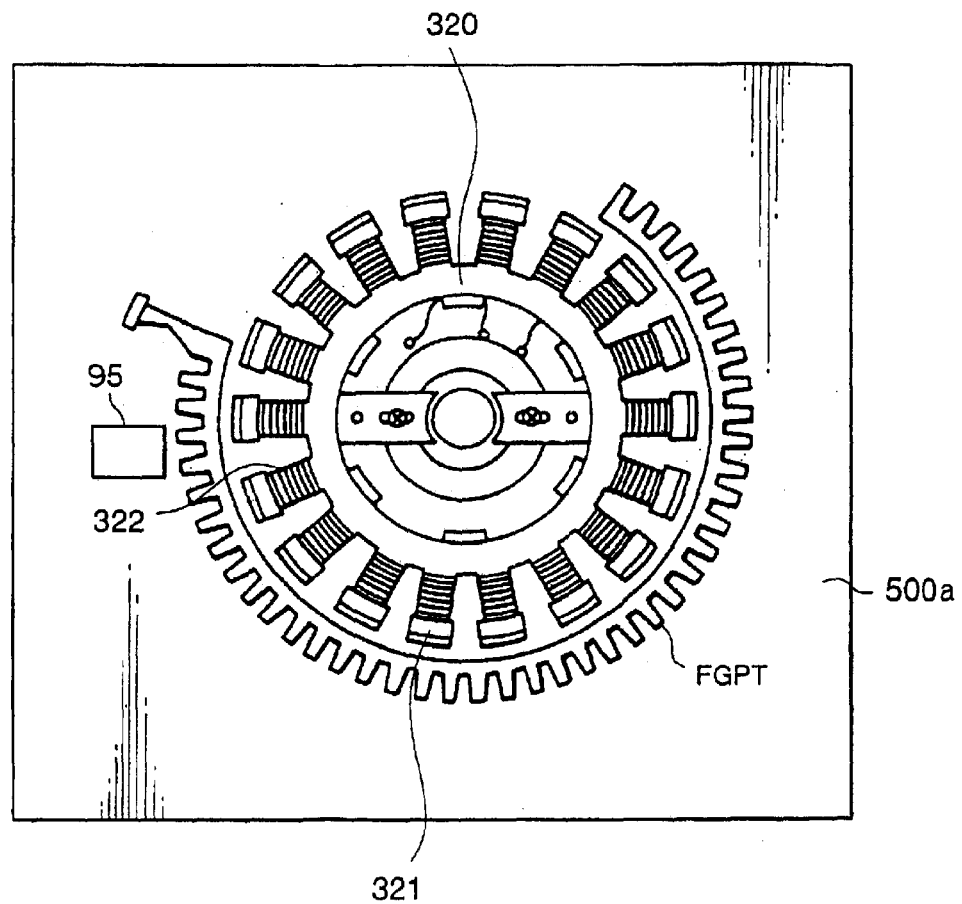
FIG. 6 is a plan view for use in describing a structure of a stator in the direct-drive motor illustrated in FIG. 5.

As shown in FIG. 6, on the printed wiring board 500, a frequency generation pattern FGPT is formed around the stator 320 of the DD motor 300. In other words, the frequency generation pattern FGPT is arranged to oppose to the motor-servo magnetized elements (detection magnetized portions) of the permanent magnet 315 (FIG. 5) such that a predetermined gap is formed distance left therebetween. In addition, FIG. 6 illustrates a case where the stator 320 has eighteen poles. That is, the stator cores 321 (or the stator coils 322) of the stator 320 are equal in number to eighteen. In this event, the rotor 310 (FIG. 5) has the main magnetized elements which are equal in number to twenty-four. In this connection, as described above, when the stator 320 has fifteen poles, the rotor 310 has the main magnetized elements which are equal to twenty.

When the motor-servo magnetized elements of the permanent magnet 315 rotate over the frequency generation pattern FGPT, a counter-electromotive force generates in the frequency generation pattern FGPT. Inasmuch as the motor-servo magnetized elements of the permanent magnet 315 are equal in number to one hundred and twenty for a round, a signal of sixty cycles generates from the frequency generation pattern FGPT when the DD motor 300 makes one rotation. This signal is called an FG servo signal. When the number of revolutions of the DD motor 300 is equal to 300 RPM, the DD motor 300 makes five rotations per second. In this event, the FG servo signal has a frequency of (60×5) or 300 Hz.

Accordingly, it is possible to control the rotation speed of the DD motor 300 by comparing the FG servo signal with a divided clock signal having a divided clock frequency of 300 Hz which is obtained by frequency dividing a reference clock signal having a reference clock frequency of 1 MHz by using a counter. In other words, a speed control of the DD motor 300 is carried out by starting the counter in synchronism with a leading edge timing of the FG servo signal and by comparing a trailing edge timing of the FG servo signal with a trailing edge timing of the divided clock signal which is obtained by counting a fixed value in the counter. More specifically, if the trailing edge timing of the FG serve signal is earlier than the trailing edge timing of the divided clock signal, the DD motor 300 is controlled so as to decelerate the rotation speed of the DD motor 300. Conversely, if the trailing edge timing of the FG serve signal is later than the trailing edge timing of the divided clock signal, the DD motor 300 is controlled so as to accelerate the rotation speed of the DD motor 300.

As described above, the conventional flexible disk drive requires the printed wiring board 500 in order to compose the DD motor 300. In addition, the conventional flexible disk drive further requires the motor frame 400 (FIG. 1) made of metal like the main frame 13 to support the DD motor 300 on the side of the frame back surface of the main frame 13. In the conventional flexible disk drive, it is easy to electrically connect the printed wiring board 500 with the main printed wiring board 30 if they are arranged adjacent to each other.

As shown in FIGS. 5 and 6, the printed wiring board 500 has a main surface 500a on which an index detection Hal element 95 is disposed. The index detection Hall element 95 and the above-mentioned index detection magnet 340 are arranged with they apart from each other by a little distance at a magnetic field detection position as shown in FIG. 5. As shown in FIG. 5, the printed wiring board 500 is disposed on the motor frame 400 so as to extend perpendicular to the rotation axis 11a of the spindle motor 300. As a result, the index detection Hall element 95 is necessary disposed on the printed wiring board 500 so that a magnetic field detection surface 95a thereof extends in parallel with a direction of a magnetic field generated from the index magnet 340 (i.e. a radial direction in regard to the rotation axis 11a of the spindle motor 300 in FIG. 5). This is because, structurally, the index detection Hall element 95 is generally disposed (mounted) on the printed wiring board 500 so that the magnetic field detection surface 95a always extends in parallel with the main surface 500a of the printed wiring board 500 on which the index detection Hall element 95 is mounted. In other words, a generally commercially available Hall element has a magnetic field detection surface so that normal to the magnetic field detection surface extends perpendicular to a mounting surface thereof.

Figure 7:
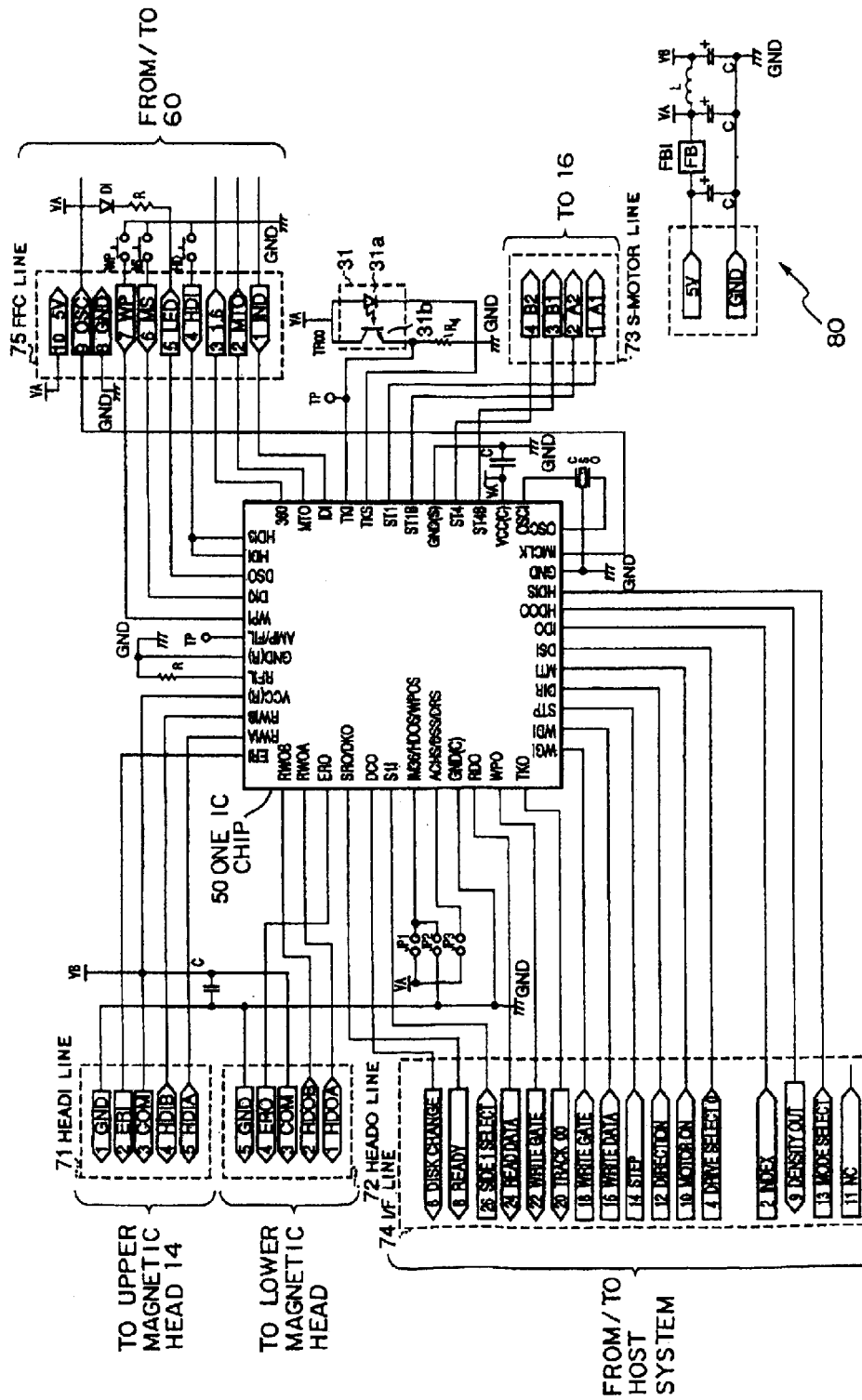
FIG. 7 is a plan view showing an external appearance of one IC chip of a conventional FDD control apparatus for controlling the flexible disk drive illustrated in FIGS. 1 and 2.
Figure 8:
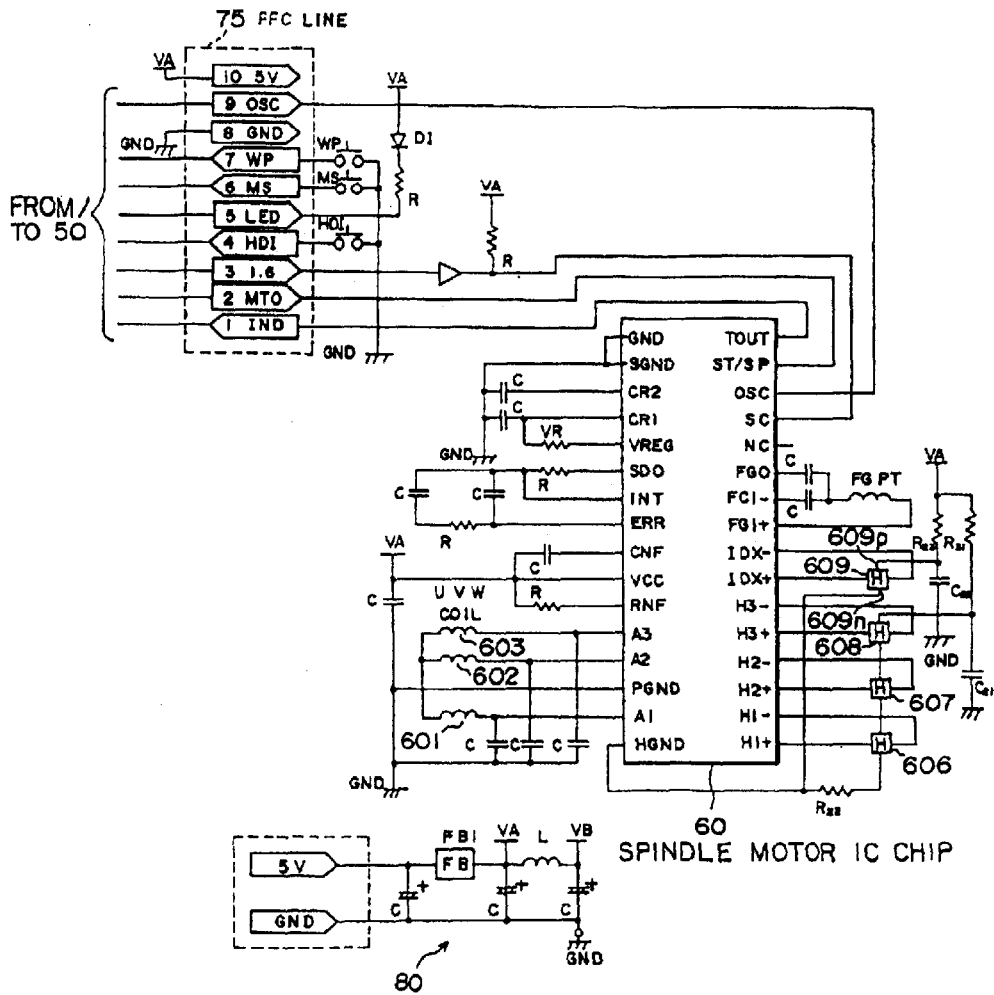
FIG. 8 is plan view showing an external appearance of a spindle motor IC chip of the conventional FDD control apparatus that is used together with the one IC chip illustrated in FIG. 7.

Referring to FIGS. 7 and 8, the description will proceed to a conventional FDD control apparatus for controlling the conventional flexible disk drive illustrated in FIGS. 1 and 2.

The illustrated FDD control apparatus comprises one integrated circuit (IC) chip 50 (FIG. 7), a spindle motor IC chip 60 (FIG. 8), and a power supply circuit 80. The one IC chip 50, the spindle motor IC chip 60, and the power supply circuit 80 are mounted on the main printed wiring board 30 (FIG. 1). The spindle motor IC chip 60 is an IC chip for controlling drive of the spindle motor 300 (FIG. 5) and is implemented by a bipolar IC chip where a number of bipolar transistors are integrated therein. On the other hand, the one IC chip 50 is implemented by a metal oxide semiconductor (MOS) IC chip where a number of MOS field effect transistors (FETs) are integrated therein. The power supply circuit 80 is a circuit for supplying a voltage of 5 V when a power switch (not shown) is turned on. The power supply circuit 80 has a first power supply terminal VA and a second power supply terminal VB.

Figure 9:
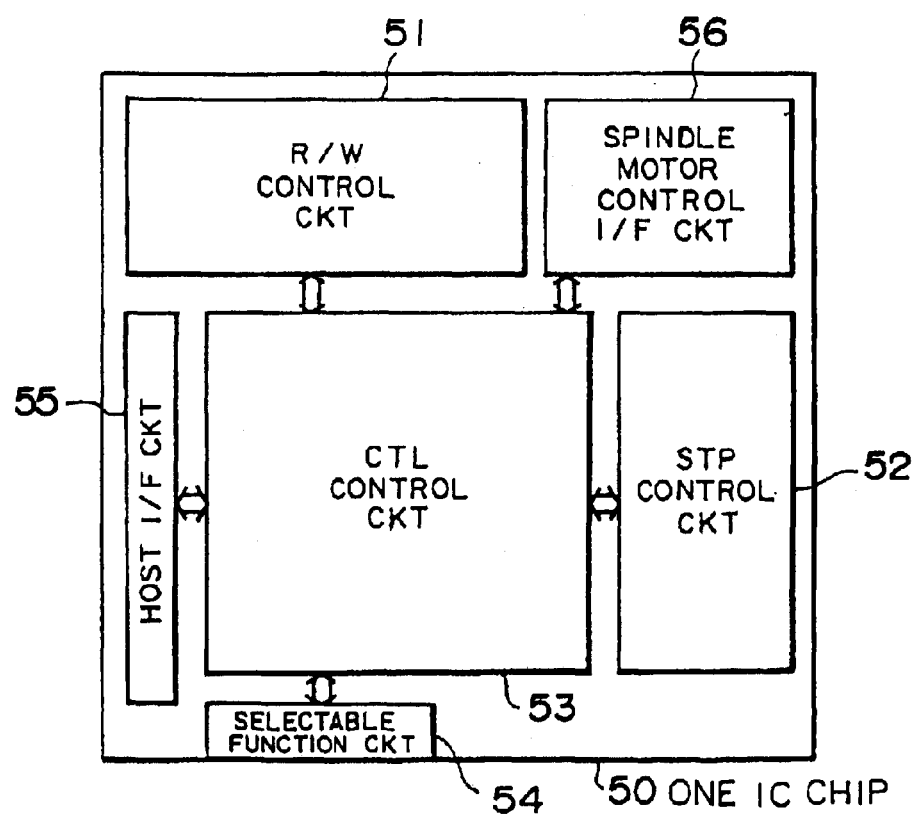
FIG. 9 is a block diagram showing a schematic structure of the one IC chip illustrated in FIG. 7.

Referring to FIG. 9 in addition to FIG. 7, the one IC chip 50 incorporates first through third control circuits 51, 52, and 53 therein. The first control circuit 51 is a R/N control circuit for controlling reading/writing of data. The second control circuit 52 is a STP control circuit for controlling drive of the stepping motor 16 (FIG. 1). The third control circuit 53 is a CTL control circuit for controlling whole operation of the floppy disk drive and may be called a logic circuit.

The one IC chip 50 further comprises the above-mentioned selectable function circuit depicted at 54, a host interface (I/F) circuit 55, and a spindle motor control I/F circuit 56. The CTL control circuit 53 is connected to R/W control circuit 51, the STP control circuit 52, the selectable function circuit 54, the host I/F circuit 55, and the spindle motor control I/F circuit 56.

The R/W control circuit 51 is connected to the upper magnetic head 14 (FIG. 1) and the lower magnetic head (not shown) through a HEAD1 line 71 and a HEAD0 line 72, respectively. The STP control circuit 52 is connected to the stepping motor 16 (FIG. 1) through an S-MOTOR line 73. The host I/F circuit 55 is connected to a host system (not shown) through an I/F line 74. The spindle motor control I/F circuit 56 is connected to the spindle motor IC chip 60 (FIG. 8) through an FFC line 75.

Now, the description will proceed to input/output terminals of the one IC chip 50. The one IC chip 50 has R/W output terminals (ER1, RW1A, RW1B, ERO, RWOA, RWOB, VCC(R)) which are connected to the HEAD1 line 71 and the HEAD0 line 72. In addition, the one IC chip 50 has STP output terminals (ST1, ST1B, ST4, ST4B) which are connected to the S-MOTOR line 73. Furthermore, the one IC chip 50 has host input/output terminals (DCO, SII, RDO, WPO, TKO, WGI, WDI, STP, DIR, MTI, DSI, IDO, HDOO, HDIS) which are connected to the I/F line 74. The one IC chip 50 has spindle motor controlling input/output terminals (IDI, MTO, 360, HDI3, HDI, DSO, DKI, WPI, 1MCLK) which are connected to the FFC line 75. Other than these input/output terminals, the one IC chip 50 has two selectable function input terminals (1M36/HDOS/WPOS, ACHS/DSS/DRS), three input terminals for the OO sensor (AMP/FIL, TKI, TKS), and so on.

The photointerrupter 31 serving as the OO sensor which comprises a light emitting diode (LED) 31a acting as the light-emitting element and a photo transistor 31b acting as the light-receiving element. The light emitting diode 31a has an anode connected to the first power supply terminal VA (Vcc) and a cathode connected to the TKS terminal of the one IC chip 50. The photo transistor 31b has a collector connected to the first power supply terminal VA (Vcc). In addition, the photo transistor 31b has an emitter which is grounded through a resistor $R_4$ and which is connected to the TKI terminal and the AMP/FIL terminal of the one IC chip 50.

Turning to FIG. 8, the spindle motor 300 controlled by the spindle motor IC chip 60 is a brushless three-phase D.C. motor which has three-phase coils (stator windings) 601, 602, and 603 of U-phase, V-phase, and W-phase although detailed structure thereof is illustrated in FIG. 5 as described above. In addition, the spindle motor 300 comprises the permanent magnet type rotor 310 (FIG. 5) and a rotor position detector (which will later be described) for producing rotor position detected signals. On the other hand, the spindle motor IC chip 60 incorporates a driving transistor (a transistor rectifier) therein which consists of a plurality of bipolar transistors. That is, responsive to a rotor position of the motor, the spindle motor 300 makes the bipolar transistors turn on and off to flow an electric current in the stator winding in question, thereby generates torque between magnetic poles of the rotor 310 and the stator windings 322 to rotate the rotor 310. With rotation of the rotor 310, the rotor position detected signals produced by the rotor position detector are changed in order to change the stator windings 322 flowing the electric current, thereby continuing the rotation of the rotor 310.

In addition, the spindle motor 300 comprises the frequency generation pattern FGPT for detecting the rotation speed of the rotor 310 as shown in FIG. 6. The spindle motor IC chip 60 changes the stator windings 322 to flow the electric current on the basis of the rotation speed of the rotor 310 detected by the frequency generation pattern FGPT in accordance with the rotor position detected signals produced by the rotor position detector.

As shown in FIG. 8, three Hall elements 606, 607, and 608 are used as the above-mentioned rotor position detector. See, for example, U.S. Pat. No. 4,882,511 issued to Johann von der Heide as regards detailed relationship for arrangement of the three Hall elements 606 to 608. At any rate, the three Hall elements 606 to 608 are arranged at intervals of an electric angle of 120 degrees. In addition, another Hall element 609 is the index detection Hall element 95 illustrated in FIG. 6.

In the manner which is described above, the conventional flexible disk drive must comprise not only the main frame 13 but also the motor frame 400 for mounting the DD motor (spindle motor) 300 thereon. In other words, the motor frame 400 is constituted as another piece different from the main frame 13 as illustrated in FIG. 1. In addition, the main frame 13 is also called a main chassis while the motor frame 400 is also called a motor base.

In the conventional DD motor (the spindle motor) 300, the permanent magnet 315 composing the rotor 310 has a bottom portion opposite to a main surface 400a of the motor frame 400 (the main surface 500a of the printed wiring board 500) that is subjected to motor-servo magnetized elements along the circumferential direction thereof. The main surface 400a of the motor frame 400 and the bottom portion of the permanent magnet 315 are opposite to each other with a predetermined gap G' so as to enable to detect the motor-servo magnetized elements by the frequency generation pattern FGPT.

In the DD motor (the spindle motor) 300, on rotating the rotor 310, an adsorption force (a magnetic attractive force) between the permanent magnet 315 composing the rotor 310 and the motor frame 400 acts as a torque loss against a rotation direction of the DD motor 300. In order to improve a motor torque of the DD motor (the spindle motor) 300, it is desirable to weaken the adsorption force for the motor frame 400 by the permanent magnet 315 by widening the gap as far as possible.

However, in the conventional DD motor (spindle motor) 300, the bottom portion of the permanent magnet 315 opposite to the motor frame 400 is subjected to the motor-servo magnetized elements along the circumferential direction thereof. Therefore, if the above-mentioned gap G' is widened, the frequency generation pattern FGPT produces the counterelectromotive force having a small output caused by rotation of the rotor 310 (the motor-servo magnetizes elements of the permanent magnet 315). Accordingly, in the conventional flexible disk drive, it is difficult to widen the above-mentioned gap G' in the DD motor (the spindle motor) 300 up to a predetermined distance or more. As a result, it is difficult to prevent the torque loss in the DD motor (the spindle motor) 300, as mentioned in the preamble of the instant specification.

Now, the description will proceed to an embodiment of this invention with reference to figures in more detailed. Inasmuch as a flexible disk drive according to this invention comprises a lot of parts which are similar in structure to those of the conventional flexible disk drive, the description will be made as regards parts different from the conventional flexible disk drive.

Figure 10:
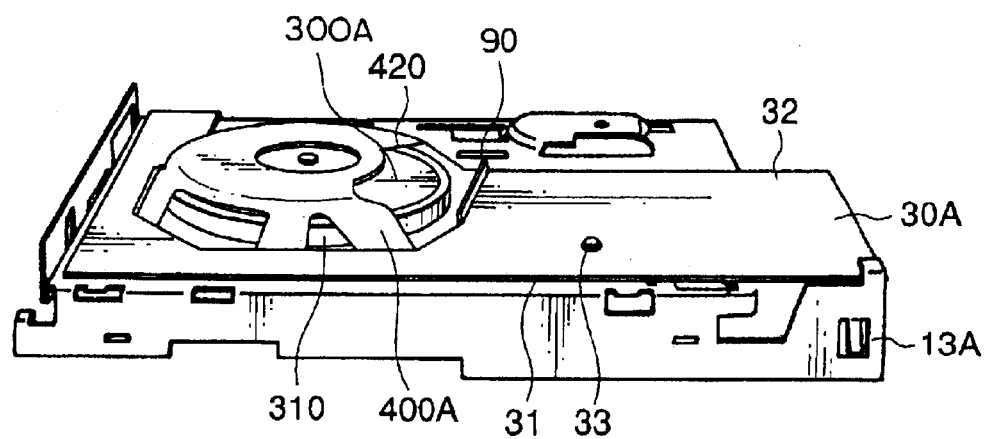
FIG. 10 is a schematic perspective view of a state where a main printed wiring board and a sub printed wiring board are mounted on a main frame for use in a flexible disk drive according to an embodiment of this invention as seen from the obliquely lower lateral side.

Referring to FIG. 10, the description will proceed to a frame structure or a main frame 13A for use in a flexible disk drive according to an embodiment of this invention. FIG. 10 is a schematic perspective view of the main frame 13A as view from lower side obliquely.

In the manner as apparent from FIG. 10, the illustrated main frame (frame structure) 13A is composed of one piece in which the main frame 13A and a motor frame part 400A are integrated. The main frame 13A is made of magnetic material. The flexible disk 40 (FIG. 3) is inserted or loaded in the main frame 13A. A spindle motor 300A (which will later be described with reference to a figure in more detailed) for rotatably driving the inserted flexible disk is mounted on the motor frame part 400A. That is, the main frame 13A serves both as an original main frame (i.e. the main frame 13 in FIG. 1) and an original motor frame (i.e. the motor frame 400 in FIG. 1).

The motor frame part 400A has a drawn-shape obtained by drawing the main frame 13A. The motor frame part 400A protrudes into the back side of the main frame 13A to form a top surface which is a part of the frame back surface of the main frame 13A. In the top surface of the motor frame part 400A, an opening window 420 for drawing out leads of the spindle motor 300A is formed.

In addition, although the drawn-shape of the motor frame part 400A illustrated in FIG. 10 is a circular shape, it is not restricted to this and may be a polygonal shape or an oval shape in response to depth or material of the motor frame part 400A. In addition, a drawing shirked shape in the drawn-shape of the motor frame part 400A is also not restricted to that illustrated in FIG. 10 and may be various shapes. Furthermore, a connection way between the motor frame part 400A and the main frame 13A is also not restricted to that illustrated in FIG. 10.

The flexible disk drive according to the embodiment of this invention can adopt the main frame 13A having the above-mentioned shape because the flexible disk drive does not have the frequency generation pattern FGPT (FIG. 6) and the printed wiring board 500 which are necessary to control the spindle motor 300. Moreover, the motor-servo magnetized elements formed at the bottom portion of the permanent magnet 315 of the rotor 310 are unnecessary because the flexible disk drive does not have the frequency generation pattern FGPT. Instead, the flexible disk drive comprises an electronic processing unit which functions as a combination of the frequency generation pattern FGPT and the motor-servo magnetized elements. Operation of the electronic processing unit is similar to that described in Japanese Unexamined Patent Publication Tokkai No. 2001-178,185 or JP-A 2001-178185 which is already proposed by the present co-inventors. Inasmuch as the electronic processing unit only indirectly relates to this invention, the description thereof is omitted herein.

The flexible disk drive according to the embodiment of this invention comprises a main printed wiring board (a main circuit board) 30A which is attached to the frame back surface of the main frame 13A like the conventional flexible disk drive. The main printed wiring board 30A has a shape such as to avoid overlapping with the motor frame part 400A. The main frame 13A has a supporting piece (not shown) which is raised from the frame back surface of the main frame 13A by cutting and bending and which has a threaded hole formed in its tip portion. The main printed wiring board 30A is fixed to the supporting piece by a screw 33 engaged with the threaded hole so that a main surface 31 of the main printed wiring board 30A is spaced at a predetermined distance from the frame back surface of the main frame 13A and a back surface 32 of the main printed wiring board 30A is nearer to the frame back surface of the main frame 13A than the top surface of the motor frame part 400A.

Figure 11:
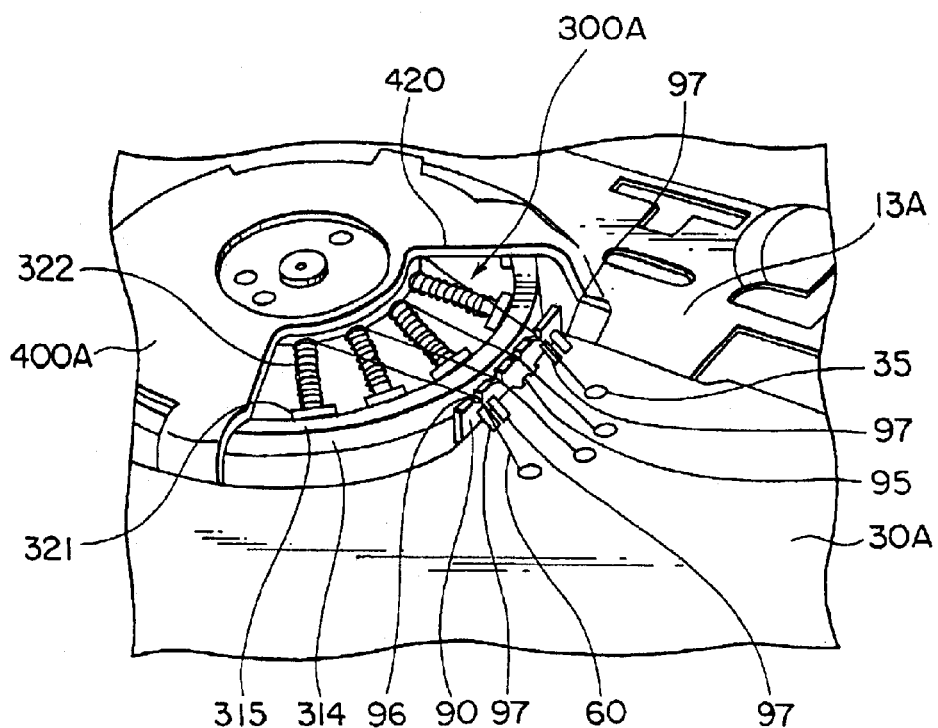
FIG. 11 is a view showing a state where leads are put on ditches of sub printed wiring board illustrated in FIG. 10.

Referring to FIG. 11 in addition to FIG. 10, on the side of the frame main surface of the main frame 13A, end portions (i.e. leads) of rotor coils wound around stator cores of the spindle motor 300A mounted on the motor frame part 400A are drawn out to the back side of the main frame 13A through the opening window 420 formed in the main frame 13A and are connected to predetermined terminals on the main printed wiring board 30A. Generally, the leads 60 are equal in number to four. Three of the leads 60 correspond to U, V and W phases of the three-phase alternating current. The remaining one of the leads 60 is connected to the other ends of the leads of the U, V and W phases.

The flexible disk drive according to the embodiment of this invention further comprises a sub printed wiring board (a sub circuit board) 90. The sub printed wiring board 90 is for guiding the leads 60. On the sub printed wiring board 90, the index detection Hall element 95 is mounted.

The main printed wiring board 30A extends in a direction perpendicular to the rotation axis 11a of the spindle motor 300A. On the other hand, the sub printed wiring board 90 is attached to the main printed wiring board 30A at a position close to an external peripheral side of the rotor 310 of the spindle motor 300A so as to extend in a direction in parallel with the rotation axis 11a of the spindle motor 300A.

In addition, the index detection Hall element 95 is attached on the sub printed wiring board 90 so that a magnetic field detection surface thereof is opposed to the external peripheral side surface of the rotor 310. In addition, the index detection Hall element 95 has four terminals (not shown) which are electrically connected to wiring (not shown) in the main printed wiring board 30A via solder 97. The solder 97 plays not only a role of such an electrical connection but also a role of a mechanical connection between the main printed wiring board 30A and the sub printed wiring board 90.

Drawn out from the opening window 420, the leads 60 are held and fixed on the sub printed wiring board 90 with the leads 60 put on ditches 96 of the sub printed wiring board 90. The leads 60 have tips which are connected and fixed to predetermined terminals 35 of the main printed wiring board 30A.

Figure 12:
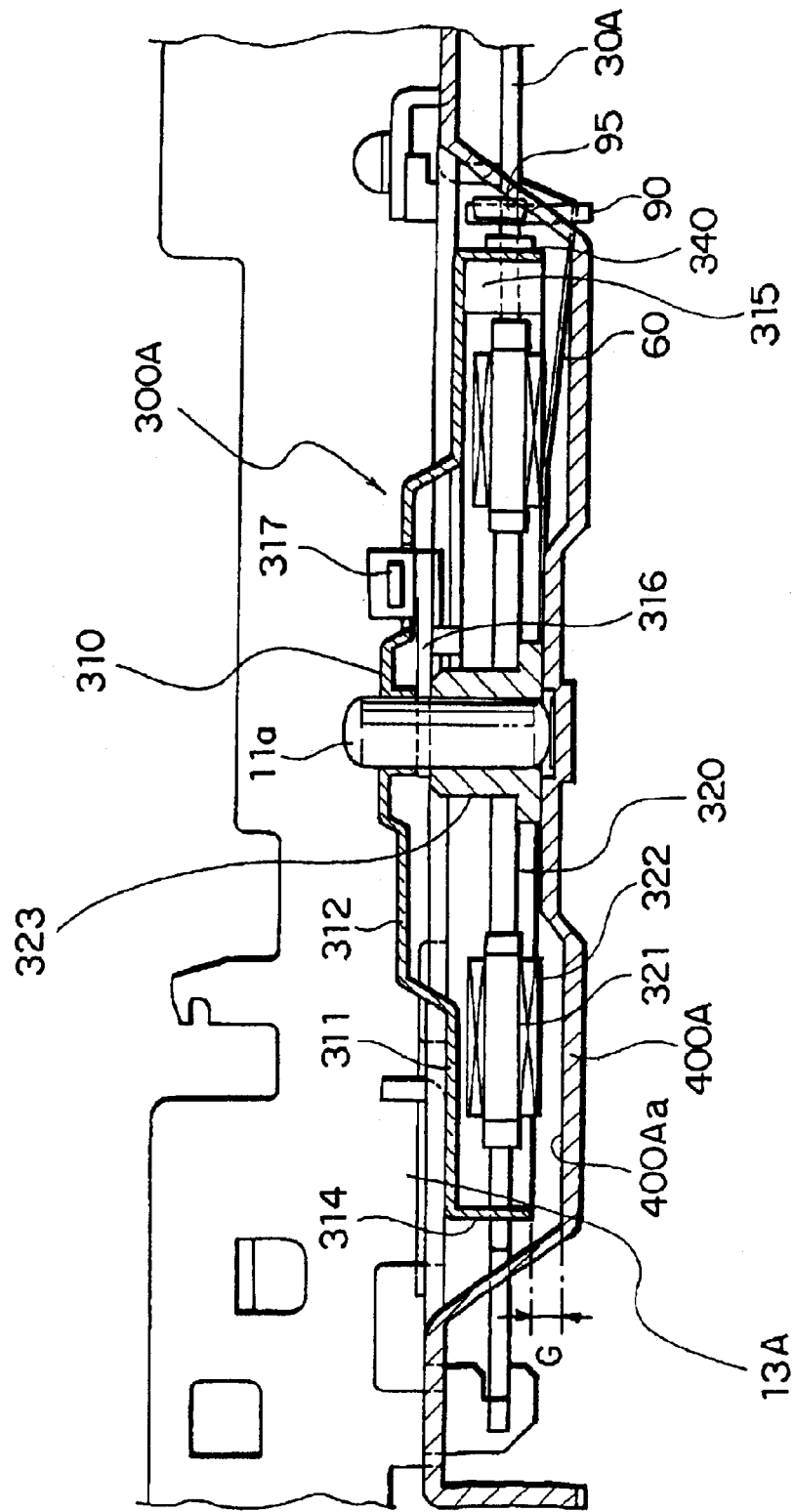
FIG. 12 is a sectional view showing a direct-drive motor (spindle motor) for use in the flexible disk drive illustrated in FIG. 10.

Referring to FIG. 12, the description will proceed to the DD motor (spindle motor) 300A for use in the flexible disk drive according to this invention.

The illustrated DD motor 300A is substantially similar in structure and operation to the DD motor 300 illustrated in FIG. 5 except that a gap G between a frame main surface 400Aa of the motor frame part 400A in the main frame 13A and a bottom portion of the permanent magnet (main magnet) 315 in the rotor 310 is different from the gap G' in the DD motor 300 illustrated in FIG. 5. Accordingly, the same reference symbols are attached to those having functions similar to those illustrated in FIG. 5 and their description is omitted for simplifying of the description.

In the manner which is described above, inasmuch as the frequency generation pattern FGPT (FIG. 6) is not required in the flexible disk drive according to this invention, the printed wiring board 500 for forming the frequency generation pattern FGPT thereon is also omitted from the flexible disk drive according to this invention. As a result, it is possible to widen the above-mentioned gap G than the gap G' in prior art.

Therefore, according to this invention, the above-mentioned gap G is set to a distance so that the rotor 310 does not fall due to gravity by attracting the rotor 310 to the main frame 13A (the motor frame part 400A) by the magnetic attractive force of the permanent magnet (main magnet) 315 even if the rotor 310 is turned upside down to the stator 320. It is therefore possible to weaken the adsorption force (the magnetic attractive force) for the motor frame part 400A by the permanent magnet 315. As a result, it is possible to prevent the torque loss in the DD motor (the spindle motor) 300A.

In addition, inasmuch as it is possible to improve a torque of the spindle motor, it is possible to lower a grade of material in the permanent magnet and it results in providing a flexible disk drive having a low cost.

While this invention has thus far been described in conjunction with a preferred embodiment thereof, it is to be understood that modifications will be apparent to those skilled in the art without departing from the spirit of the invention.

What is claimed is:

1. A flexible disk drive comprising:
    a main frame in which a flexible disk is insertable, said main frame being made of magnetic material and having a main surface; and
    a direct-drive motor, mounted on the main surface of said main frame, for rotatably driving said flexible disk,
    wherein said direct-drive motor comprises a stator disposed on the main surface of said main frame and a rotor rotatably supported on said stator, wherein said stator includes N poles and three-phase coils wound around the N poles, where N represents a first positive integer which is a multiple of three, wherein said rotor includes a permanent magnet having M main magnetized elements, where M represents a second positive integer which is not less than four and which is different from the first positive integer, wherein said rotor is disposed on the main surface of said main frame with a gap between the main surface of said main frame and said permanent magnet without lying a printed wiring board for forming a frequency generation pattern thereon at a state where said rotor is magnetically attracted to said main frame without said printed wiring board by a magnetic attractive force of said permanent magnet, wherein said gap is set at a distance so that said rotor does not fall due to gravity by attracting said rotor to said main frame by the magnetic attractive force of said permanent magnet even if said rotor is turned upside down to said stator, and wherein said main frame comprises a single piece in which said main frame and a motor frame part are integrated, and said direct-drive motor is mounted on said motor frame part, and said motor frame part has an opening window for drawing out leads of said direct-drive motor.

2. A flexible disk drive as claimed in claim 1, wherein said motor frame part comprises a drawn portion of said main frame.

* * * * *